Patented Apr. 12, 1927.

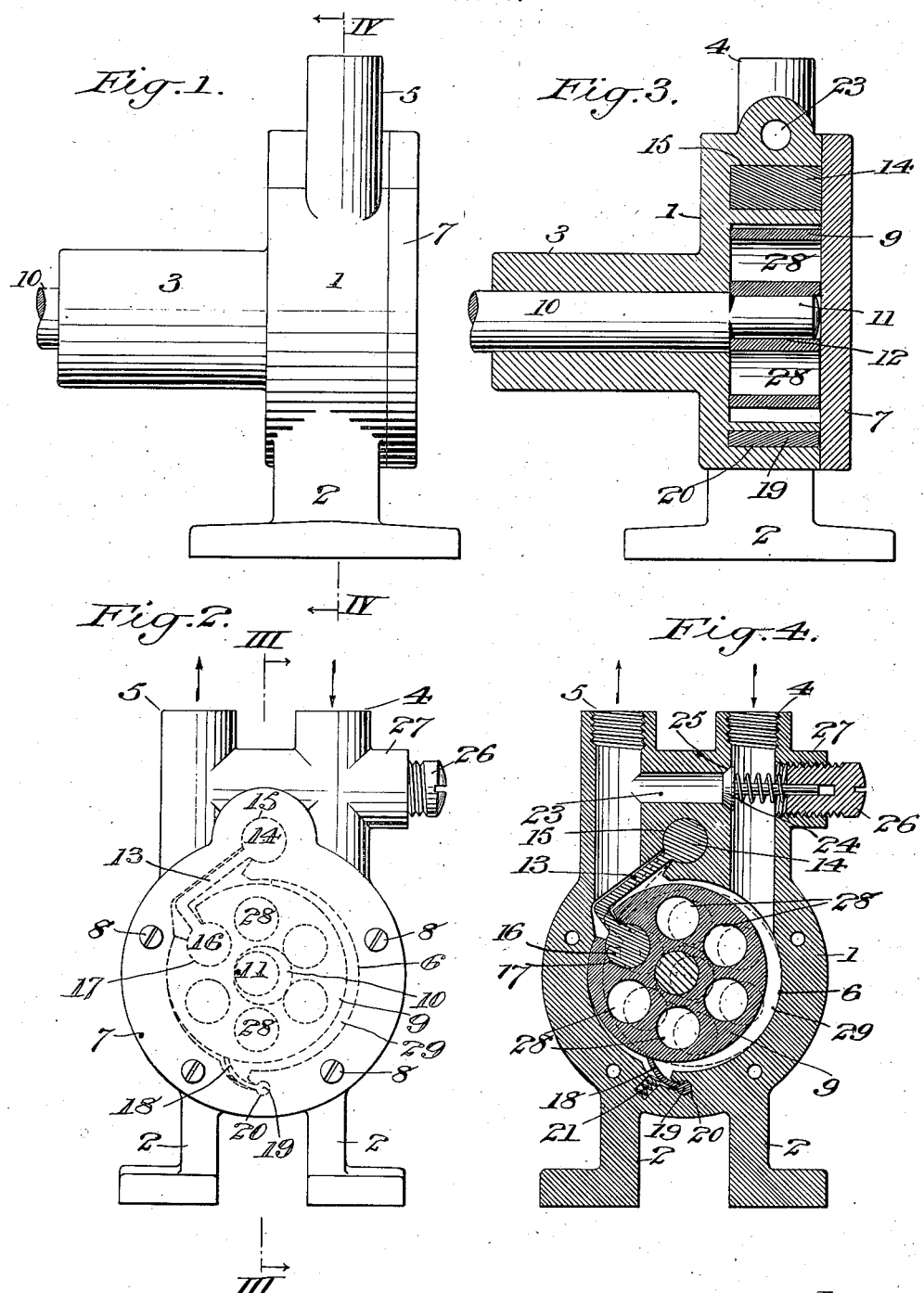

1,624,607

UNITED STATES PATENT OFFICE.

GEORGE W. LEIMAN, OF NEWARK, NEW JERSEY, ASSIGNOR TO LEIMAN BROS., OF NEW YORK, N. Y., A COPARTNERSHIP COMPOSED OF WILLIAM H. LEIMAN, GEORGE W. LEIMAN, GUSTAVE A. LEIMAN, EDWARD C. LEIMAN, AND JOHN LEIMAN.

PUMP.

Application filed December 16, 1921. Serial No. 522,874.

This invention relates to an improvement in pumps, and has for its object to provide a device which is simple, efficient and durable in construction.

Another object is to provide a pump having a piston hinged and arranged to be oscillated by a crank shaft.

Another object is to provide a pump having a piston provided with a means whereby the device may be automatically primed when set in motion.

Another object is to provide certain improvements in the form, construction and arrangement of the several parts whereby the above named and other objects may be effectively attained.

A practical embodiment of my invention is represented in the accompanying drawings, in which—

Fig. 1 represents a side elevation of my improved pump.

Fig. 2 represents a front view of the same.

Fig. 3 represents a vertical section taken in the plane of the line III—III of Fig. 2, and Fig. 4 represents a vertical section taken in the plane of the line IV—IV of Fig. 1.

The casing of the pump comprises a body denoted by 1 having supporting members 2, a hub 3, an inlet 4, and an outlet 5. The inlet and outlet ports connect with a cylindrical chamber 6 formed in the body 1, which chamber is closed by a plate 7 screwed to the body by screws 8. A cylindrical piston 9 is located in the chamber 6, the peripheral diameter of which piston is smaller than the interior diameter of the chamber 6, so that the piston will be permitted to oscillate therein.

Motion is imparted to the piston by means of a shaft 10 journaled in the hub 3, which shaft receives its rotation from a source of power (not shown). The end of the shaft 10 is reduced eccentrically to form a crank 11 which is journaled in a bearing 12 in the piston.

The link 13 serves to maintain the piston in its position in the chamber, which link is provided at one end with an enlarged head 14 journaled in a recess 15 in the body 1. The other end of the link is turned at substantially an angle of 90° and has an enlarged head 16 which is journaled in a recess 17 in the piston 9. Thus it will be seen that the link 13 will hold the piston so that as the shaft and crank are rotated, the piston will be oscillated in the chamber 6.

In order that the liquid may be prevented from returning to the chamber 6, I provide a check valve in the form of an oscillating wing 18 having an enlargement 19 arranged to hinge in a recess 20 in the body 1. A spring 21, located at the back of the wing 18 and seated in a pocket 22, serves to hold the free edge of the wing in contact with the outer periphery of the piston.

A passage 23 formed in the body 1, is interposed between the inlet and outlet ports, the function of which is to return any excess liquid pumped to the outlet 5. This passage 23 is closed at the inlet side by a spring actuated valve 24 which engages a seat 25 in the passage 23. The pressure of the valve on its seat may be varied by means of a plug 26 having a screw threaded engagement with a boss 27 on the inlet, the movement of which plug increases or diminishes the tension of the spring on the valve.

This piston 9 is also provided with a series of holes 28 which during operation become filled with liquid and serve to lubricate the walls of the chamber. When the pump is out of operation, the holes retain a certain amount of liquid which gradually leaks into the chamber 6 and acts as a primer for the pump when set in motion.

In operation: As the shaft with its crank 11 are rotated, the piston is moved so that its exterior periphery will be caused to contact at some one point with the interior surface of the chamber 6 and, by reason of the difference in the diameters of the piston and the chamber, and the piston touching the walls of the chamber at one point, a pocket 29 will be formed diametrically opposite the contact point of the piston and chamber, which pocket is graduated in opposite directions. This pocket 29 receives and progressively moves with the piston so that the liquid will be forced around in the chamber from the inlet 4 until it registers with the outlet 5 where it will be liberated and passed therethrough. In the rotation of the shaft and crank, the link holds the piston against rotation on the crank, and is permitted a sufficient lateral movement to allow the piston to contact with the interior surface of the chamber at all points. In the position of the piston shown in Fig. 4, the liquid is permitted to flow freely into the pocket 29 and as the piston is oscillated, the upper surface will come into contact with the upper interior surface of the chamber 6 which surfaces are brought together and as the piston is oscillated and advanced the inlet 4 will be closed and the supply cut off as shown in dotted lines in Fig. 4, at which position the pocket 29 will be in alinement with the outlet 5 and the liquid free to pass therethrough.

The position and construction of the oscillating wing 18 prevents the liquid from flowing back to the inlet port 4 and, as the body of the liquid in the pocket is forced toward the outlet, it engages the wing and causes it to move outwardly against the tension of the spring. After the liquid in the pocket has passed the wing 18, the pressure will be against the back of the wing and so cause the wing to impinge the periphery of the piston to prevent leakage therethrough.

It is evident that various changes may be resorted to in the form, construction and arrangement of the several parts without departing from the spirit and scope of my invention; hence, I do not wish to limit myself to the specific details herein shown and described except as they may be included in the claims.

What I claim is:

1. A pump comprising a casing having a cup shaped cylindrical chamber formed therein, inlet and outlet ports for said chamber, a rotary shaft provided with a crank, a cylindrical piston having substantially an uninterrupted working periphery of a slightly smaller diameter than the diameter of said chamber and mounted on said crank in position to be oscillated eccentrically in the chamber, a link comprising a short arm and a straight long arm disposed at right angles to each other, the free end of said short arm being connected to the piston and the long arm linked to the casing between the inlet and outlet ports, a cavity in the wall of the chamber adjacent the outlet port for housing said link, whereby the movement of the long arm will open and close the outlet port, a spring actuated curved wing hinged in the casing and having its free end arranged to extend into the chamber in position to engage the bottom of the working periphery of the piston, and a plate secured to the casing for covering the chamber, piston, wing, link and cavity.

2. A pump comprising, a casing having a cup shaped cylindrical chamber formed therein, inlet and outlet ports for said chamber, a rotary shaft provided with a crank, a cylindrical piston having substantially an uninterrupted working periphery of a slightly smaller diameter than the diameter of the chamber and mounted on said crank in position to be oscillated eccentrically in the chamber, said piston being provided with a series of independent transverse recesses extending through the piston for retaining certain of the liquid, a link comprising a short arm and a straight long arm disposed at right angles to each other, the free end of said short arm being connected to the piston and the long arm linked to the casing between the inlet and outlet ports, a cavity in the casing adjacent the outlet port for housing said link, and a plate secured to the casing for covering the chamber, piston, recesses, link and cavity.

In testimony, that I claim the foregoing as my invention, I have signed my name this 6th day of December, 1921.

GEORGE W. LEIMAN.